United States Patent
Jensen

(10) Patent No.: US 7,431,447 B2
(45) Date of Patent: Oct. 7, 2008

(54) IMAGING APPARATUS ACCESS DOOR

(75) Inventor: Julie B. Jensen, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1030 days.

(21) Appl. No.: 10/317,643

(22) Filed: Dec. 12, 2002

(65) Prior Publication Data

US 2004/0114192 A1 Jun. 17, 2004

(51) Int. Cl.
*B41J 29/13* (2006.01)
*B41J 2/41* (2006.01)
*B41J 2/385* (2006.01)
*B41J 2/325* (2006.01)
*G01D 15/28* (2006.01)
*G01D 15/06* (2006.01)
*G01D 15/10* (2006.01)
*G03G 15/00* (2006.01)

(52) U.S. Cl. ............ 347/108; 347/152; 347/170; 347/222

(58) Field of Classification Search ......... 347/108, 347/138, 152, 170, 222; 346/143, 145; 400/88, 400/691, 693
See application file for complete search history.

(56) References Cited

U.S. PATENT DOCUMENTS

| | | | |
|---|---|---|---|
| 1,422,433 A | | 7/1922 | Fries |
| 4,330,219 A | * | 5/1982 | Miyasaka et al. ........ 400/690.4 |
| 4,641,982 A | | 2/1987 | Rekewitz |
| 4,828,417 A | | 5/1989 | Tano et al. |
| 4,859,092 A | * | 8/1989 | Makita ...................... 400/83 |
| 4,948,283 A | | 8/1990 | Imaizumi et al. |
| 5,207,521 A | * | 5/1993 | Ricca et al. ............. 400/647.1 |
| 5,242,217 A | | 9/1993 | Gonnet |
| 5,523,848 A | * | 6/1996 | Musso et al. ............... 358/296 |
| 5,567,068 A | * | 10/1996 | Egashira et al. ............ 400/625 |
| 5,704,167 A | | 1/1998 | Swinderman |
| D414,751 S | * | 10/1999 | Yogalingam ............... D14/335 |
| 6,005,744 A | | 12/1999 | Terashima |
| 6,038,099 A | | 3/2000 | Heinze et al. |
| 6,256,192 B1 | * | 7/2001 | Shannon ..................... 361/683 |
| 6,494,633 B1 | * | 12/2002 | Crosby et al. .............. 400/668 |
| 6,942,211 B2 | * | 9/2005 | Teo et al. .................... 271/145 |
| 7,029,113 B2 | * | 4/2006 | Hwang ....................... 347/108 |
| 2003/0052956 A1 | * | 3/2003 | Katsuyama ................. 347/108 |
| 2003/0184643 A1 | * | 10/2003 | Fujiwara .................... 347/222 |

OTHER PUBLICATIONS

IBM Technical Disclosure Bulletin, vol. 7, No. 9, issued Feb. 1965 for "Double-Hinged Cover" of M. A. Lockhart, p. 829.
IBM Technical Disclosure Bulletin, vol. 24, No. 8, issued Jan. 1982 for "Cover Section for Paper Opening of a Printer" of W. E. Mott and I. D. Shakib, p. 4348.

* cited by examiner

*Primary Examiner*—Stephen D Meier
*Assistant Examiner*—Leonard S Liang

(57) ABSTRACT

Disclosed herein is an imaging apparatus that includes an access door for reducing clearance space requirements.

13 Claims, 7 Drawing Sheets

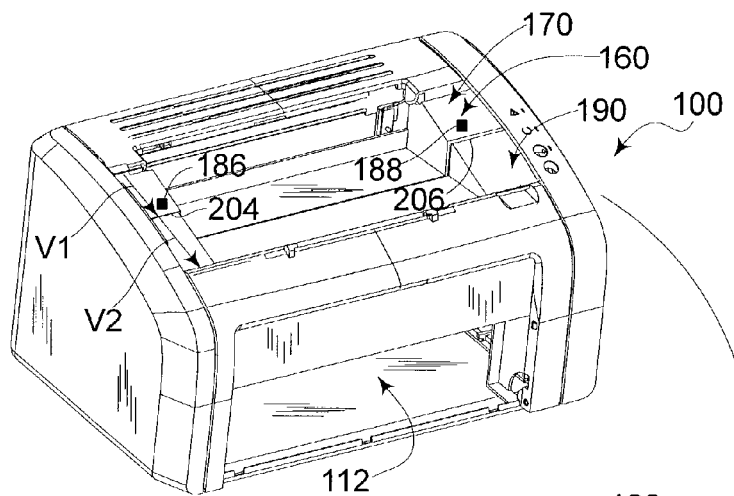
Fig. 9a
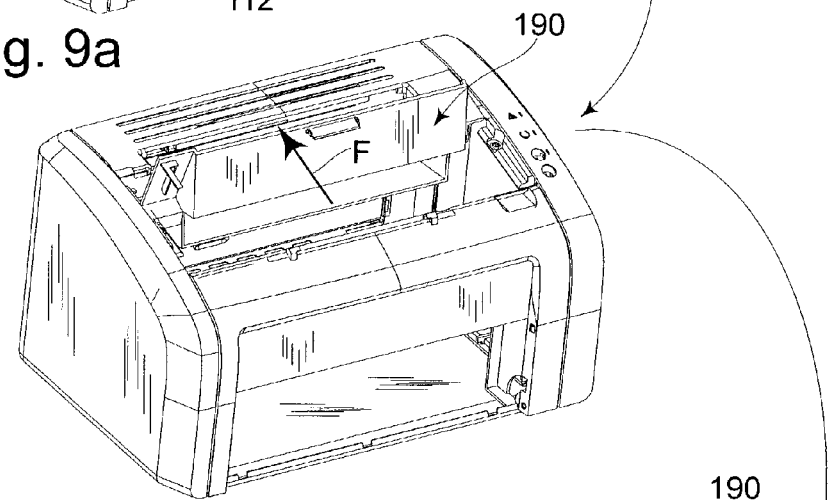
Fig. 9b
Fig. 9
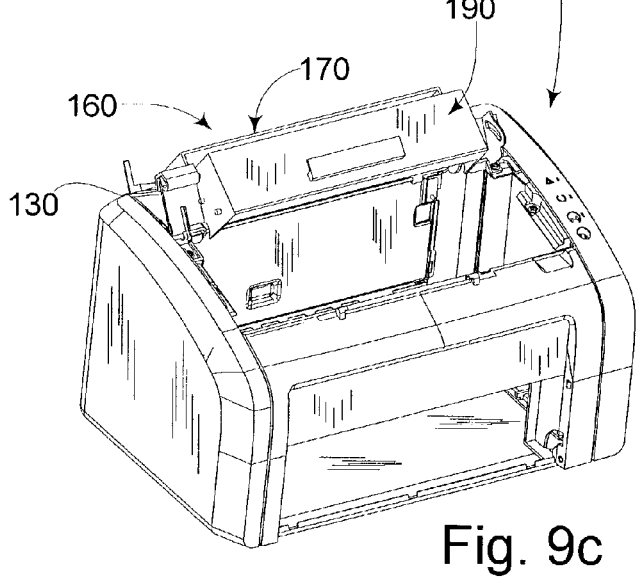
Fig. 9c

IMAGING APPARATUS ACCESS DOOR

BACKGROUND

Many types of conventional imaging apparatus are provided with an access door that requires substantial 'clearance space'. As used herein, the term 'clearance space' means the unoccupied space near an imaging apparatus through which an access door travels when moving between its closed and open positions. If this clearance space is occupied, the access door may be prohibited from functioning properly.

One illustrative example of a conventional imaging apparatus 20 is shown in FIGS. 1-4. With particular reference to FIG. 1, this exemplary conventional imaging apparatus 20 may be provided with an internal portion 22, an external portion 24 and a housing 30. The housing 30 may substantially separate the internal portion 22 from the external portion 24.

The housing 30 may be provided with a bottom 32, a top 34, a first side 36, a second side 38, a front 40 and a back 42. The housing bottom 32, top 34, first side 36, second side 38, front 40 and back 42 may be configured in a somewhat parallelepiped configuration. This configuration may result in the top 34 being somewhat oppositely disposed from the bottom 32. The second side 38 may be somewhat parallel to and oppositely disposed from the first side 36. Additionally, the front 40 may be somewhat parallel to and oppositely disposed from the back 42.

With continued reference to FIG. 1, the imaging apparatus 20 may also be provided with an access panel 60. This access panel 60 may be located on any surface of the housing 30, such as, for example, on the top 34. This locality of the access panel 60 on the top 34 is provided for illustrative purposes only (and, the access panel 60 may be mounted on other surfaces of the housing 30 as required). The access panel 60 may be provided with an internal surface 62 (FIG. 2) and an oppositely disposed external surface 64. Under most operating conditions, the access panel internal surface 62 may be adjacent to the imaging apparatus internal portion 22; additionally, the access panel external surface 64 may be adjacent to the imaging apparatus external portion 24.

With reference to FIG. 2, the access panel 60 may also be provided with a first hinge 70, a second hinge 72 and a first edge 74. The first hinge 70 and second hinge 72 may reside on a first axis A1 (FIG. 3 illustrates a side elevation view that is perpendicular to the first axis A1). The hinges 70, 72 may pivotally attach the access panel 60 to the housing 30. This pivotal attachment may enable passage of objects (e.g. a toner cartridge) between the external portion 24 and the internal portion 22. The first edge 74 may be oppositely disposed from the first axis A1 by a first length L1.

As illustrated in FIG. 3, the imaging apparatus 20 may also define a second length L2 spanning between the housing bottom 32 and the point of attachment for the access panel 60 (i.e. the first axis A1).

With reference to FIG. 4, having provided a brief description of one type of exemplary conventional imaging apparatus 20, the operation thereof will now be described. When access to the internal portion 22 (FIGS. 1, 2) is required, such as to replace a consumable, component, or to clear a jam, the access panel 60 may be rotated about the first axis A1. When rotating the access panel 60, the access panel 60 travels through a region referred to as clearance space 80. The clearance space 80 may extend to a third distance L3 above the housing bottom 32. This third distance L3 may be the sum of the first distance L1 and the second distance L2.

Those familiar with operation of this type of imaging apparatus 20 may appreciate that this clearance space 80 requires that the imaging apparatus 20 be located where there is sufficient unobstructed space. If this clearance space 80 is obstructed in any manner, accessing the imaging apparatus internal portion 22 may require the imaging apparatus 20 to be removed from its typical operating location to eliminate obstruction of the access door 60.

SUMMARY

In one exemplary embodiment, an imaging apparatus defining an interior and an exterior may include: a housing partially separating the interior from the exterior; and a novel access door providing passage between the interior and exterior.

BRIEF DESCRIPTION OF THE DRAWING

FIG. 9 shows a series of three exemplary configurations of one type of imaging apparatus.

DETAILED DESCRIPTION

Figure 1:
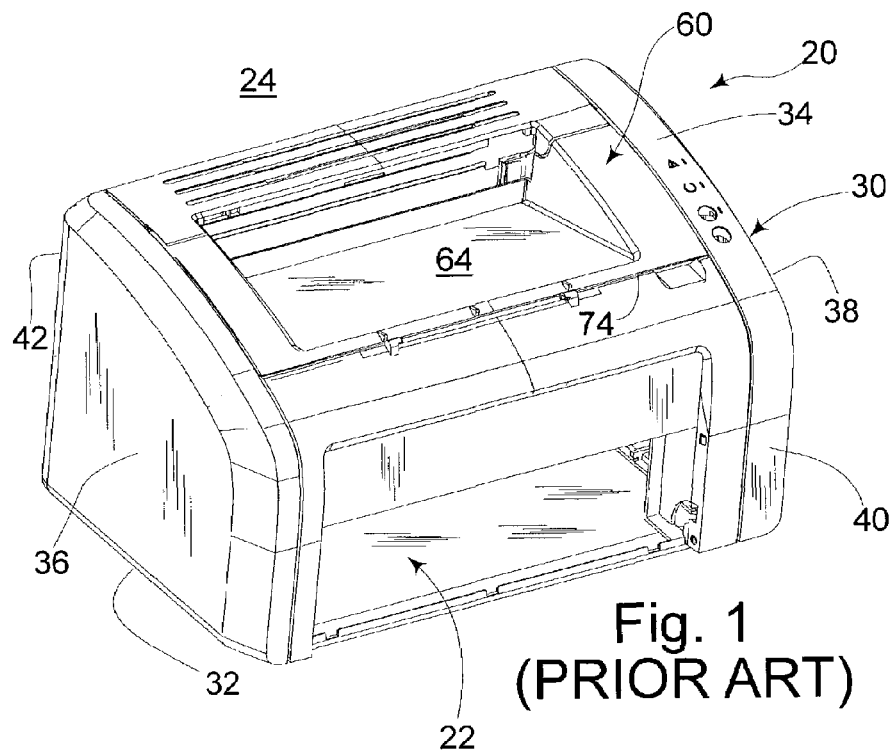
FIG. 1 shows a perspective view of one type of conventional imaging apparatus having a conventional access door provided therewith.
Figure 2:
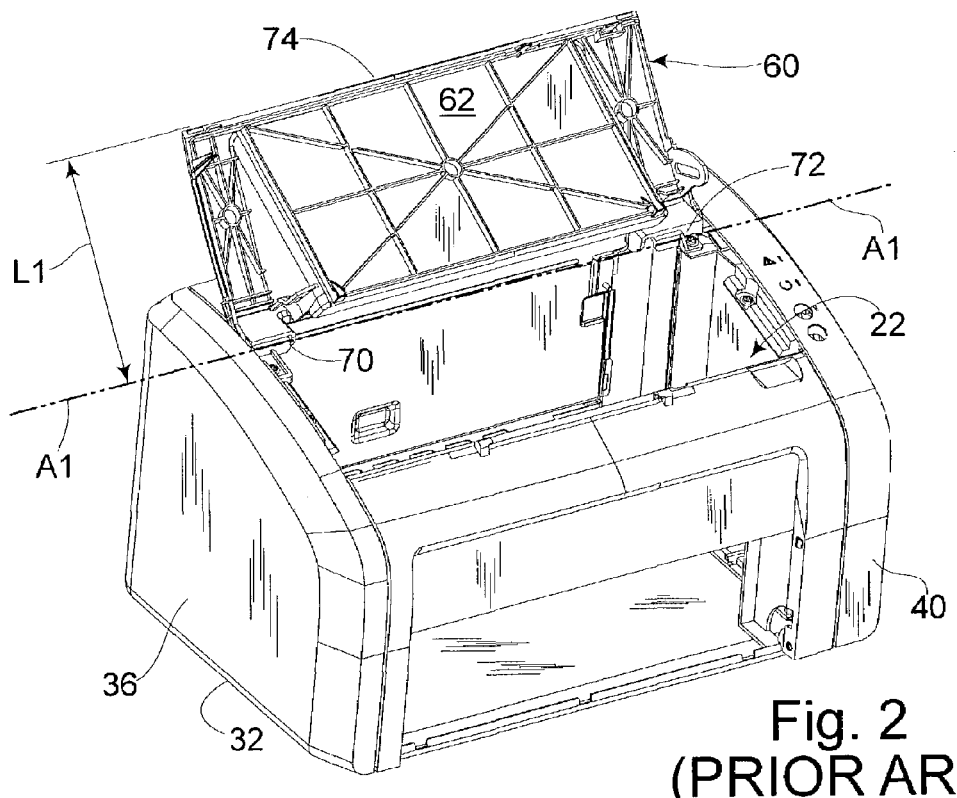
FIG. 2 shows a perspective view of the conventional imaging apparatus of FIG. 1 wherein the access door is positioned to allow access to an internal portion of the imaging apparatus.
Figure 3:
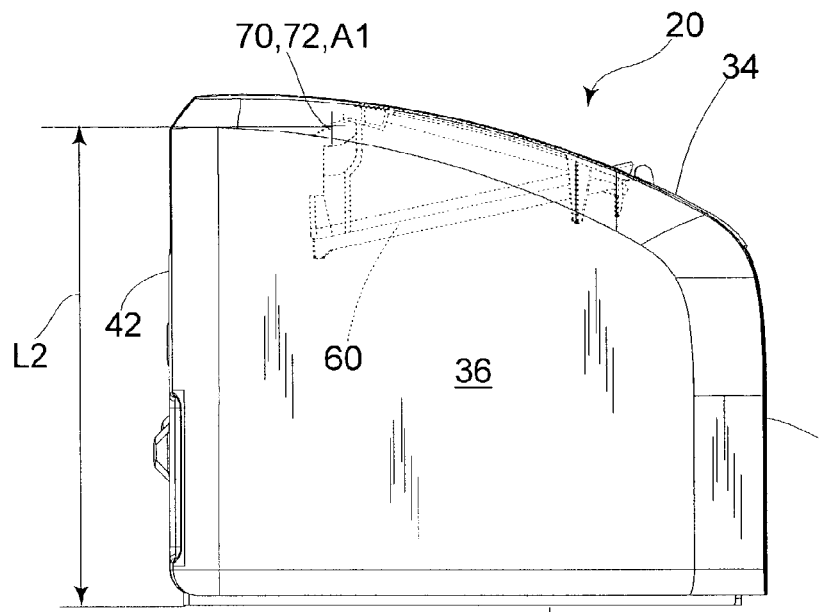
FIG. 3 shows a side elevation view of the conventional imaging apparatus of FIG. 1.

In one exemplary embodiment illustrated in FIGS. 5-11, an imaging apparatus 100 may be provided with a housing 110, an internal portion 112 and an external portion 114. The housing 110 may substantially separate the internal portion 112 from the external portion 114. As will be described in detail later herein, the imaging apparatus 100 may be provided with an access door 160 that reduces clearance space (e.g. clearance space 220, FIG. 11) requirements. This reduced clearance space enables passage between the internal and external portions 112, 114 in crowded areas.

Figure 5:
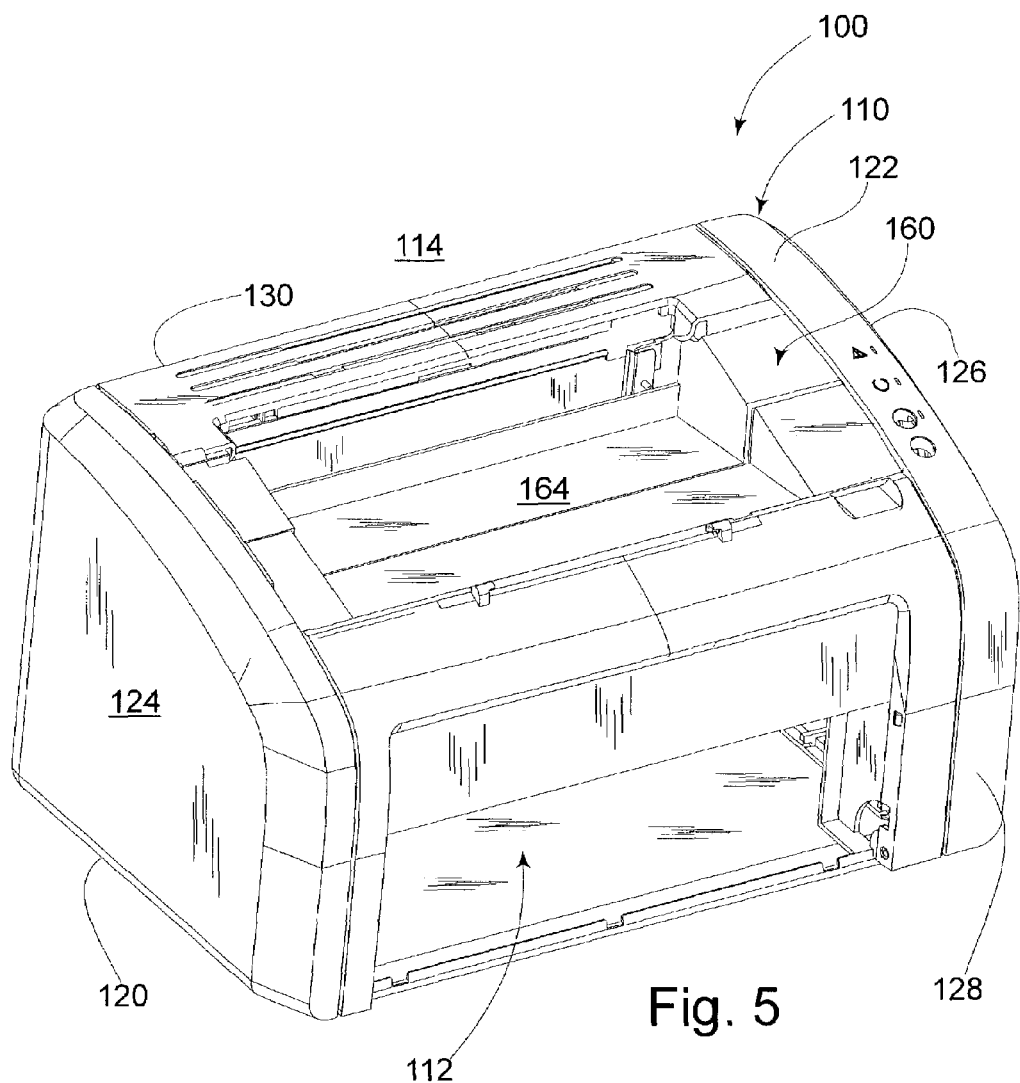
FIG. 5 shows a perspective view of one exemplary embodiment of an imaging apparatus that is provided with an access door that reduces clearance space requirements.

With reference to FIG. 5, the imaging apparatus housing 110 may be provided with a bottom 120, a top 122, a first side 124, a second side 126, a front 128 and a back 130. The housing bottom 120, top 122, first side 124, second side 126, front 128 and back 130 may be formed in a somewhat parallelepiped configuration. This configuration may result in the top 122 being somewhat oppositely disposed from the bottom 120. The second side 126 may be somewhat parallel to and oppositely disposed from the first side 124. Additionally, the front 128 may be somewhat parallel to and oppositely disposed from the back 130.

It is to be understood that terms such as 'front', 'back', 'top', 'bottom', 'horizontal', 'vertical', 'underneath' and the like are used herein for illustrative purposes only. In actual use, the imaging apparatus 100 can be configured and/or used in almost any orientation, thus making terms such as 'front', 'back', 'top', 'bottom', 'horizontal', 'vertical', etc. relative to the orientation of the imaging apparatus 100.

Figure 6:
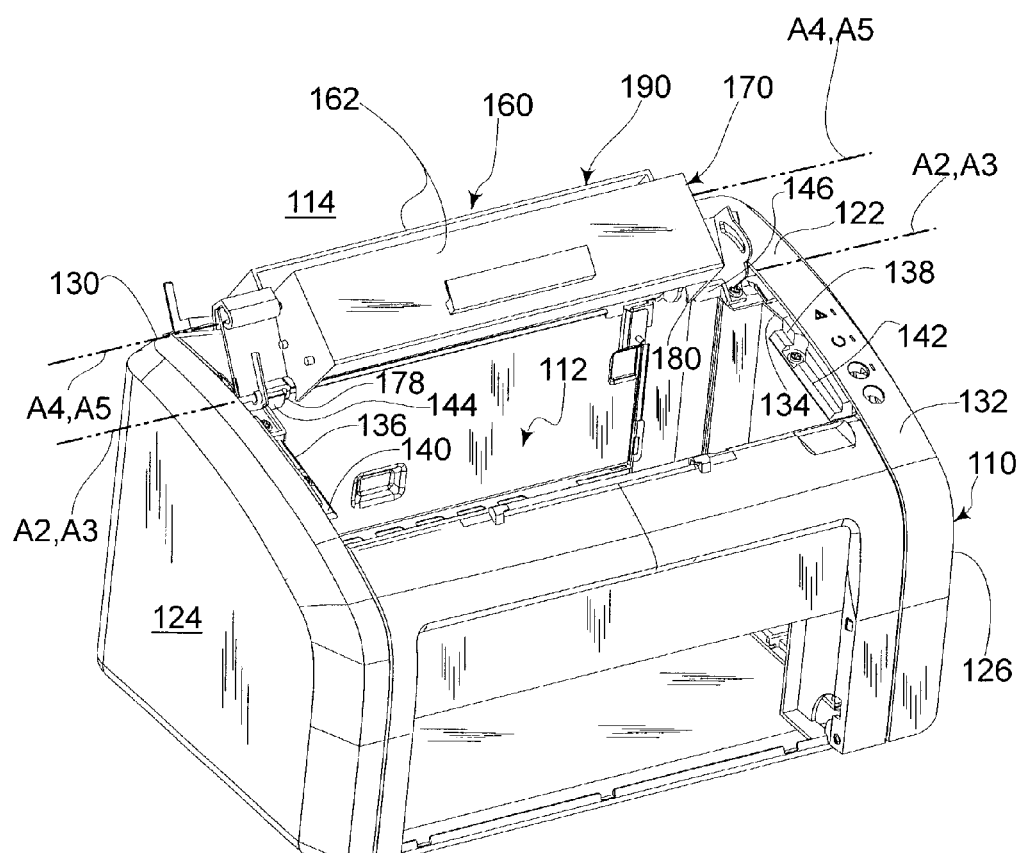
FIG. 6 shows a perspective view of the imaging apparatus of FIG. 5 wherein the access door is positioned to allow access to an internal portion of the imaging apparatus.

With reference to FIG. 6, the imaging apparatus housing top 122 may be provided with an external surface 132 and an oppositely disposed internal surface 134. The top external surface 134 may be adjacent to the imaging apparatus external portion 114; additionally, the top internal surface 134 may be adjacent to the imaging apparatus internal portion 112. The housing top 122 may be further provided with a first side 136 and a second side 138. The housing top first side 136 may be formed on the top internal surface 134 somewhat near the housing first side 124. The housing top second side 138 may be formed on the top internal surface 134 somewhat near the housing second side 126. The housing top first side 136 may be provided with a first stop 140. The first stop 140 may be formed on the first side 136 such that it protrudes therefrom. The housing top second side 138 may be provided with a second stop 142. The second stop 142 may be formed on the second side 138 such that it protrudes therefrom.

With continued reference to FIG. 6, the housing top first side 136 may be further provided with a first boss 144, the first boss 144 may protrude from the first side 136 somewhat near the housing back 130. The housing second side 138 may be further provided with a second boss 146, the second boss 146 may protrude from the second side 138 somewhat near the housing back 130. The first and second bosses 144, 146 may be formed coaxial to each other on a second axis A2.

With reference to FIG. 5, the imaging apparatus 100 may also be provided with an access door 160. This access door 160 may be located on any surface of the housing 110, such as, for example, on the top 122. The illustrated location of the access door 160 on the housing top 122 is provided for illustrative purposes only.

With continued reference to FIG. 5, the access door 160 may be provided with an internal surface 162 (FIG. 6) and an oppositely disposed external surface 164. In most operating conditions, the access door internal surface 162 (FIG. 6) may be adjacent to the imaging apparatus internal portion 112; additionally, the access door external surface 164 may be adjacent to the imaging apparatus external portion 114.

Figure 7:
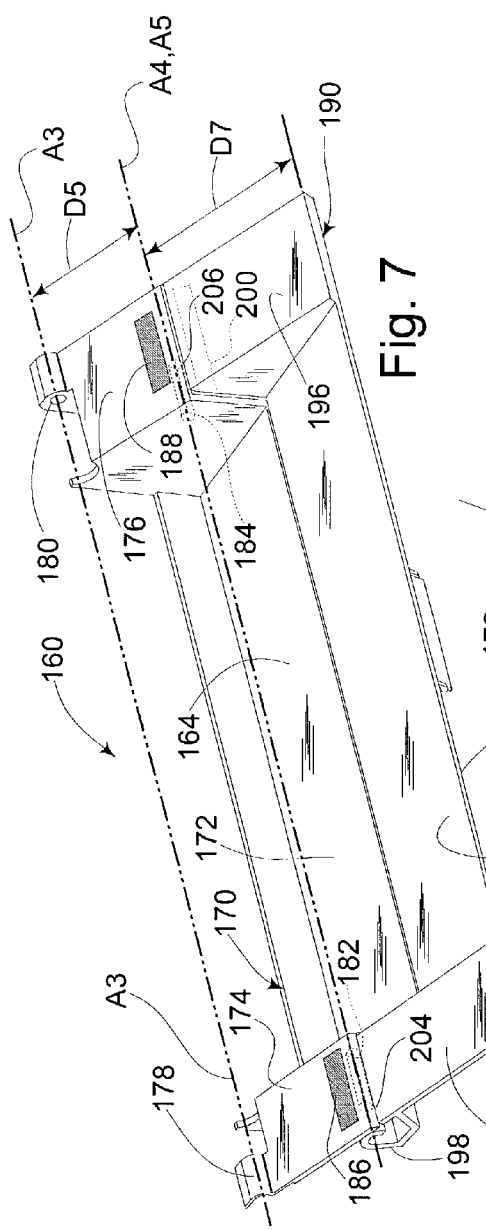
FIG. 7 shows a perspective view of one exemplary access door, this access door may be provided with a first panel and a second panel.
Figure 8:
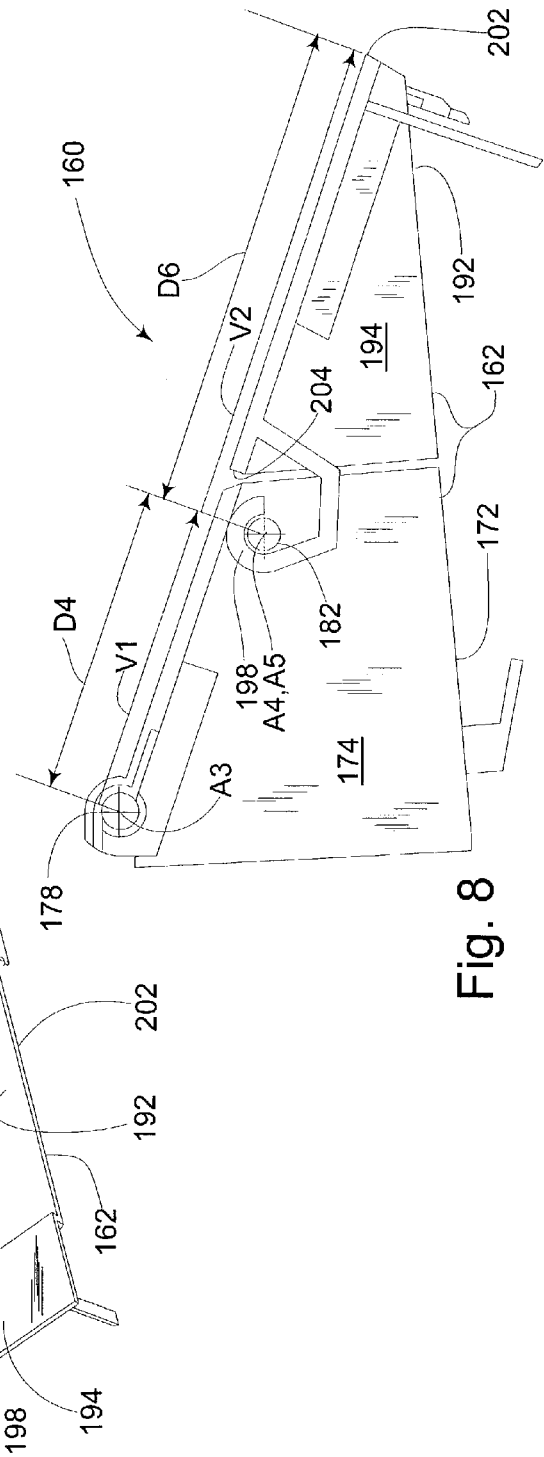
FIG. 8 shows a side elevation view of the exemplary access door illustrated in FIG. 7.

With reference to FIG. 7, the access door 160 may be provided with a first panel 170 and a second panel 190. The first panel 170 may be provided with a ramp 172, a first side 174, a second side 176, a first hinge 178, a second hinge 180, a first boss 182 and a second boss 184. The first side 174 may have a portion formed somewhat perpendicular to the ramp 172. The second side 176 may have a portion formed somewhat perpendicular to the ramp 172; additionally the second side 176 may be oppositely disposed from the first side 174. The first hinge 178 may be formed on the first side 174. The first boss 182 may be formed on the first side 174 somewhat oppositely disposed from the first hinge 178. The first boss 182 may be separated from the first hinge 178 by a fourth distance D4 (FIG. 8). The fourth distance D4 may define a first vector V1 that originates at the center of the first hinge 178 and terminate at the center of the first boss 182. With continued reference to FIG. 7, the second hinge 180 may be formed on the second side 176. The second boss 184 may be formed on the second side 176 somewhat oppositely disposed from the second hinge 180. The second boss 184 may be separated from the second hinge 180 by a fifth distance D5. The fourth and fifth distances D4, D5 may be substantially equal.

With continued reference to FIG. 7, the first hinge 178 and the second hinge 180 may reside coaxial to a third axis A3. Additionally, the first boss 182 and the second boss 184 may reside coaxially to a fourth axis A4. The first panel 170 may also be provided with a first contact patch 186 and a second contact patch 188. The first contact patch 186 may be located on the first side 174. The second contact patch 188 may be located on the second side 176.

With continued reference to FIG. 7, the second panel 190 may be provided with a ramp 192, a first side 194, a second side 196, a first hinge 198, a second hinge 200 and an edge 202. The first side 194 may have a portion formed somewhat perpendicular to the ramp 192. The second side 196 may have a portion formed somewhat perpendicular to the ramp 192 and oppositely disposed from the first side 194. The first hinge 198 may be formed on the first side 194. The edge 202 may be separated from the first hinge 198 by a sixth distance D6 (FIG. 8). The sixth distance D6 may define a second vector V2 that originates at the center of the first hinge 198 and terminates at the edge 202. The second hinge 200 may be formed on the second side 196. The edge 202 may be separated from the second hinge 200 by a seventh distance D7. The sixth and seventh distances D6, D7 may be substantially equal. The first hinge 198 and the second hinge 200 may reside coaxially to a fifth axis A5. The second panel 190 may also be provided with a first stop 204 and a second stop 206. The first stop 204 may be formed on the first side 194, while the second stop 206 may be formed on the second side 196.

With continued reference to FIG. 7, the access door first and second panels 170, 190 may be hingedly attached to each other. As illustrated in FIG. 7, this attachment of the panels 170, 190 may result in the fourth axis A4 and the fifth axis A5 being co-linear. This attachment may result in the first panel first boss 182 contacting the second panel first hinge 198. Additionally, the first panel second boss 184 may contact the second panel second hinge 200. FIG. 8 illustrates a side elevation view of this attachment of the first panel 170 to the second panel 190.

With continued reference to FIG. 6 the access door 160 may be hingedly attached to the imaging apparatus housing 110. The access door first panel 170 (and the second panel 190 hingedly attached thereto) may be hingedly attached to the housing 110 such that the second axis A2 and the third axis A3 are co-located. This attachment may result in the housing top first side first boss 144 contacting the access door first panel first side first hinge 178. This attachment may also result in the housing top second side second boss 146 contacting the access door first panel second side second hinge 180.

As those skilled in the art may appreciate, the access door 160 may be operated to provide passage through the imaging apparatus housing 110. This passage may, for example, be useful for replacing consumables located within the printer (e.g. a toner cartridge). With reference to FIG. 9, the operation of the access door 160 may include a two-step process. FIG. 9a illustrates a typical operating configuration, while FIGS. 9b and 9c illustrate two 'snapshots' of the two-step process for accessing the imaging apparatus internal portion 112 by operating the access door 160. These two steps include a second panel folding step and a first panel folding step. The culmination of the second panel folding step may be illustrated in FIG. 9b, and the culmination for the first panel folding step may be illustrated in FIG. 9c.

During most operations of the imaging apparatus 100, the access door 160 is located in the typical operating configuration (illustrated in FIG. 9a). In this typical operating configuration, the first access panel 170 and the second access panel 190 may be positioned adjoining (i.e. resting on) the housing top first side first stop 140 (FIG. 6) and the second side second stop 142 (FIG. 6).

With reference to FIG. 9, when a user desires to access the imaging apparatus internal portion 112 through the access door 160, the access door 160 may be 'folded'. As used herein, the term 'folded' refers to the action of rotating one panel about the object to which it is attached (e.g. folding the second panel 190 towards the first panel 170). This folding may result from the application of a force F (FIG. 9b) to the object being 'folded'. The action of gaining access to the internal portion 112 may begin by folding the second panel 190 towards the first panel 170 (referred to herein as the second panel folding step) by applying the force F. By folding the second panel 190 towards the first panel 170, the second panel first side first stop 204 may come into contact with the first panel first side first contact patch 186. Additionally, the second panel second side second stop 206 may come into contact with the first panel second side second contact patch 188. When contact between the first panel contact patches 186, 188 and the second panel stops 204, 206 occurs, subsequent folding of the second panel 190 may also cause 'folding' of the first panel 170. This subsequent folding of the second panel 190 that causes folding of the first panel 170 may occur as a result of the continued application of the force F onto the second panel 190.

It should be noted that in the typical operating condition illustrated in FIG. 9a, the first vector V1 and the second vector V2 may be substantially parallel (this parallelism is clearly illustrated in FIG. 8). After being disrupted from the typical operating condition to the conditions illustrated in FIGS. 9b and 9c, the first and second vectors V1, V2 may become unparallel (this unparallel orientation is clearly illustrated in FIG. 11).

During the first panel folding step (culminating with the configuration illustrated in FIG. 9c), the continued folding of the second panel 190 may result in the first panel 170 folding towards the housing back 130. This folding of the first panel 170 may create rotation of the first panel first hinge 178 (FIG. 7) about the housing first side first boss 144 (FIG. 6). This folding may also create rotation of the first panel second hinge 180 (FIG. 7) about the housing second side second boss 146 (FIG. 6). Once the imagining apparatus 100 is placed in the configuration illustrated in FIG. 9c, the access door 160 may be in a position that allows for passage of components (e.g. a toner cartridge) between the imaging apparatus internal and external portions 112, 114.

Figure 10:
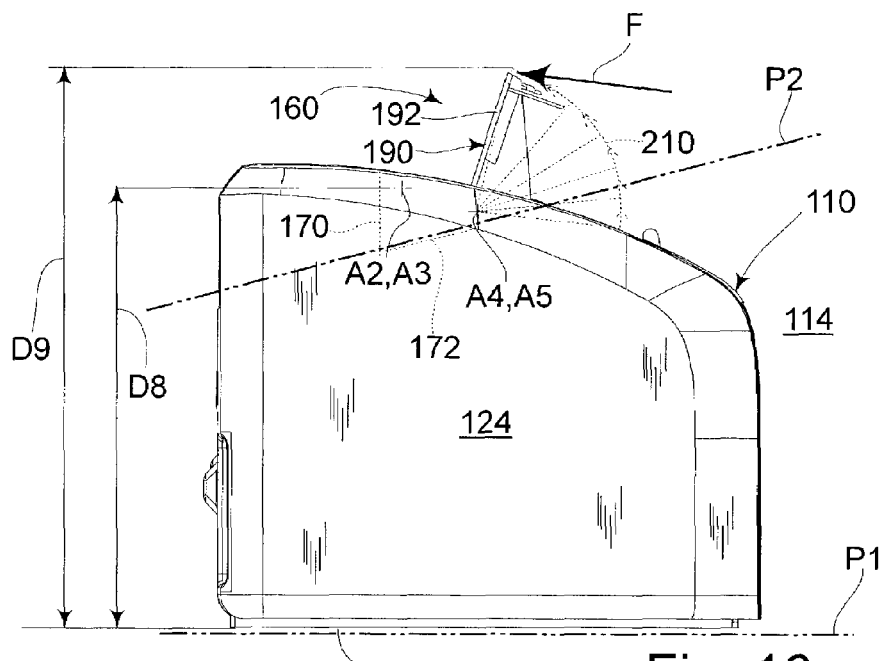
FIG. 10 shows an exemplary imaging apparatus at the culmination of a second panel folding step.

With reference to FIG. 10 showing a side elevation view of the imaging apparatus 100, the culmination of the second panel folding step partially enables passage between the internal and external portions 112, 114. FIG. 10 shows that the second and third axes A2, A3 may be located at an eighth distance D8 from the housing bottom 120. Also illustrated in FIG. 10 is a second panel clearance space 210 created during the previously described second panel folding step. The second panel clearance space 210 is the space through which the second panel 190 passes during the second panel folding step.

Figure 11:
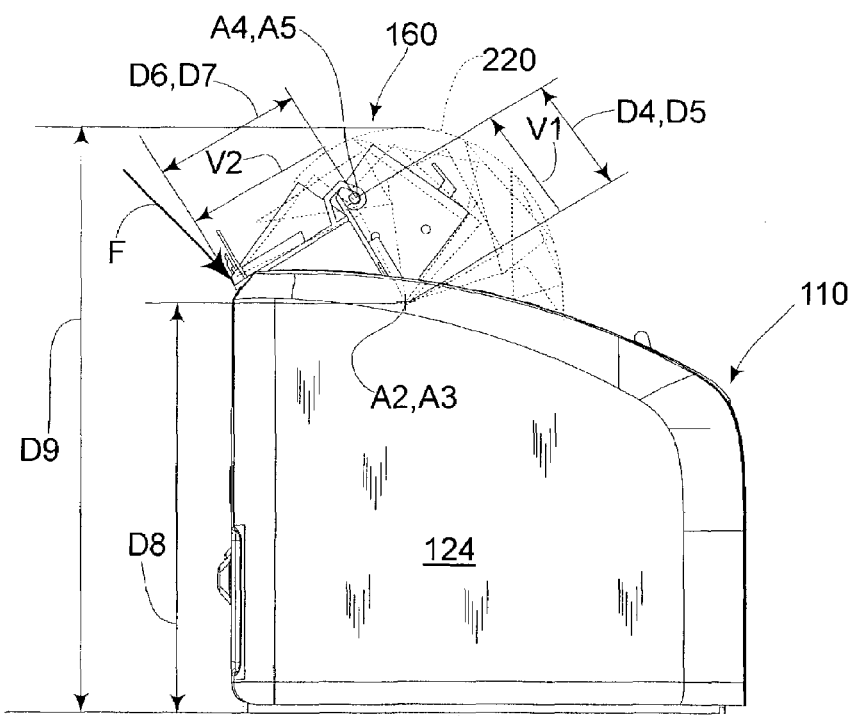
FIG. 11 shows an exemplary imaging apparatus at the culmination of a first panel folding step.

With reference to FIG. 11 showing a side elevation view of the imaging apparatus 100 at the culmination of the first panel folding step, the access door 160 is positioned to enable passage between the imaging apparatus internal portion 112 (FIG. 5) and the external portion 114. During the first panel folding step illustrated in FIG. 11, a first panel clearance space 220 may define the clearance space required to allow for proper folding of the access door 160. If an object is located within either the second panel clearance space 210 (FIG. 10) or the first panel clearance space 220, proper operation of the access door 160 may be obstructed. A ninth distance D9 illustrates the required clearance space between the housing bottom 120 and the first panel clearance space 220. This ninth distance D9 is a function of the fourth, fifth, sixth, seventh and eighth distances D4, D5, D6, D7, and D8.

Figure 4:
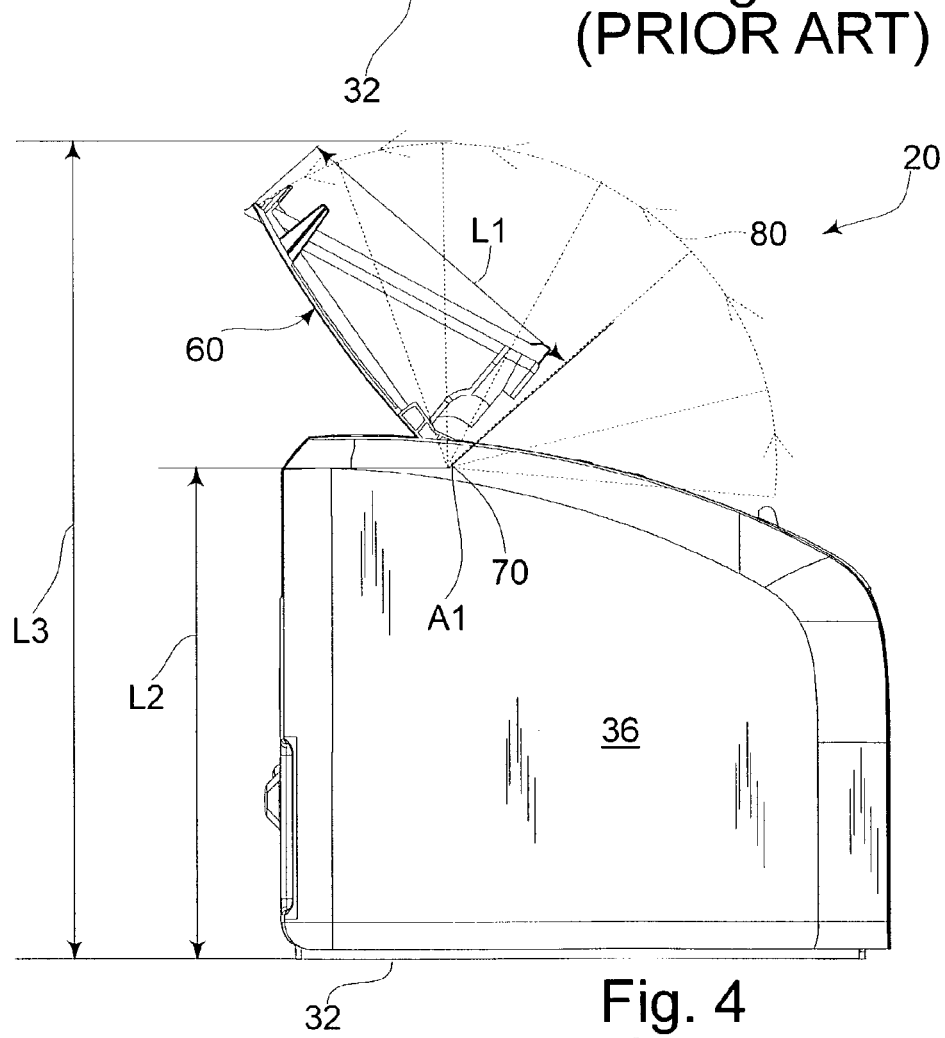
FIG. 4 shows a side elevation view of the conventional imagining apparatus of FIG. 2 configured such that the access door is positioned to allow access to the internal portion.

As can be appreciated by those skilled in the art, the ninth distance D9 illustrated in FIG. 11 (showing the present access door 160) is less than the third distance L3 illustrated in FIG. 4 (showing the conventional access door 60). Therefore, the present access door 160 allows the imaging apparatus 100 to be placed in locations where clearance space is reduced (when compared to the prior art apparatus illustrated in FIGS. 1-4). This reduction of the clearance space required to allow for accessing the imaging apparatus internal portion 112 allows the imaging apparatus 100 to be placed where clearance may be minimal (e.g. on a book shelf, under a desk, under a riser with another object positioned thereon, etc.). Additionally, this reduction of the clearance space required may also allow for other components (e.g. a scanner) to be positioned directly above the imaging apparatus 100 (so long as the clearance space requirement is met).

It is to be understood that the inventor has contemplated various alternative embodiments. In one exemplary alternative embodiment, the access panel 160 may be formed on other surfaces of the imaging apparatus housing 110 (e.g. the front 128 or the back 130).

Additionally, the present access door 160 may be implemented not only in the type of imaging apparatus illustrated in the figures, but other types of imaging apparatus now known to those skilled in the art or those later developed. As well, although the access door 160 is depicted and described for imaging apparatus 100, it may be employed in other electronic equipment as required.

In another alternative embodiment illustrated in FIG. 10, the imaging apparatus housing bottom 120 may reside on a first plane P1. This first plane P1 may be orientated substantially parallel to earth (e.g. positioned on a flat shelf, desk, floor, etc.). A second plane P2 may be positioned (at least partially) somewhere inside the imaging apparatus housing 110. The second plane P2 may intersect the first plane at an angle, such as, for example 13.5 degrees. The first panel ramp 172 and the second panel ramp 192 may be located within the second plane P2. This angled configuration of the ramps 172, 192 may be useful for ensuring that sheets of paper or other media deposited onto the access door 160 are properly stacked.

In another alternative embodiment, the access door 160 may be configured with more than two panels. The use of additional panels may allow for the required clearance space to be further reduced.

While illustrative embodiments have been described in detail herein, it is to be understood that the concepts may be otherwise variously embodied and employed and that the appended claims are intended to be construed to include such variations except insofar as limited by the prior art.

The invention claimed is:

1. A method of accessing an interior portion of an imaging apparatus, said interior portion defined by a housing, said method comprising:

providing a first panel hingedly attached to said imaging apparatus housing;

providing a second panel hingedly attached to said first panel;

folding said second panel towards said first panel; and after said folding said second panel, folding said first panel towards said housing, thereby providing access to said interior portion.

2. The method of claim 1 and further comprising:

providing a force;

wherein said force causes said folding said second panel towards said first panel; and wherein said force also causes said folding said first panel towards said housing.

3. The method of claim 1 and further wherein:

said first panel is hingedly attached to said housing about a first pivot axis and said second panel is hingedly attached to said first panel about a second pivot axis; and said first pivot axis is parallel to said second pivot axis.

4. The method of claim 3 and further wherein:

said first panel and said second panel together define a cover;

said cover defines an overall cover length measured in a direction perpendicular to said first pivot axis;

said first panel defines an overall first panel length measured in said direction perpendicular to said first pivot axis and said second panel defines an overall second panel length measured in said direction perpendicular to said first pivot axis;

prior to said folding said second panel towards said first panel, said cover length is substantially equal to the sum of said first panel length and said second panel length; and after said folding said second panel towards said first panel, said cover length is less than the sum of said first panel length and said second panel length.

5. The apparatus of claim 4 and further wherein:

said housing comprises an opening therein, said opening being selectively closable by said cover;

said opening defines an overall opening length measured in a direction perpendicular to said first pivot axis; and prior to said folding said second panel towards said first panel, said cover length is substantially equal to said opening length.

6. The method of claim 3 and further wherein:

said first panel comprises a first panel first outer side edge extending in a direction transverse to said first pivot axis and a first panel second outer side edge opposite said first panel first outer side edge and extending in a direction transverse to said first pivot axis;

said second panel comprises a second panel first outer side edge extending in a direction transverse to said first pivot axis and a second panel second outer side edge opposite said second panel first outer side edge and extending in a direction transverse to said first pivot axis;

said first panel defines a first panel width extending between said first panel first outer side edge and said first panel second outer side edge and measured in a direction parallel to said first pivot axis;

said second panel defines a second panel width extending between said second panel first outer side edge and said second panel second outer side edge and measured in a direction parallel to said first pivot axis; and said first panel width is substantially equal to said second panel width.

7. The method of claim 1 and further wherein:

said first panel comprises a first planar surface;

said second panel comprises a second planar surface; and prior to said folding said second panel towards said first panel, said first planar surface faces away from said interior portion, said second planar surface faces away from said interior portion and said first planar surface is coplanar with said second planar surface.

8. The method of claim 7 and further wherein:

said first planar surface is not coplanar with said second planar surface after said folding said second panel towards said first panel.

9. The method of claim 1, wherein the first panel projects a first distance above the housing prior to said folding and projects a second distance above the housing greater than the first distance after said folding.

10. The method of claim 1, wherein the first panel and a second panel extend over an opening into the interior portion of the imaging apparatus to a first extent prior to folding and wherein the first panel and the second panel extend over the opening to a second extent less than the first extent after said folding.

11. The method of claim 10 further comprising passing a consumable through the opening in the housing after said folding.

12. The method of claim 1 further comprising discharging media through a discharge opening onto the first panel and the second panel prior to said folding and forming a passage adjacent to the discharge opening through which consumables may be replaced after said folding.

13. A method of accessing an interior portion of an imaging apparatus, said interior portion defined by a housing, said method comprising:

providing a plurality of panels comprising:

a first panel hingedly attached to said imaging apparatus housing about a first pivot axis; and a second panel hingedly attached to said first panel about a second pivot axis, each of the plurality of panels having a length perpendicular to the first axis, the plurality of panels defining a cover having an overall cover length perpendicular to the first pivot axis; and folding said plurality of panels to provide access to said interior portion, wherein prior to said folding, the cover length is substantially equal to a sum of the lengths of each of the plurality of panels and wherein after said folding, the cover length is less than the sum of the lengths of each of the plurality of panels.

* * * * *